(12) United States Patent
Daly

(10) Patent No.: US 11,053,970 B2
(45) Date of Patent: Jul. 6, 2021

(54) TOGGLE FIXING FOR A CAVITY FIXING

(71) Applicant: fischerwerke GmbH & Co. KG, Waldachtal (DE)

(72) Inventor: Aaron Daly, Pfalzgrafenweiler (DE)

(73) Assignee: fischerwerke GmbH & Co. KG, Waldachtal (DE)

( * ) Notice: Subject to any disclaimer, the term of this patent is extended or adjusted under 35 U.S.C. 154(b) by 175 days.

(21) Appl. No.: 16/476,985

(22) PCT Filed: Jan. 8, 2018

(86) PCT No.: PCT/EP2018/050372
§ 371 (c)(1),
(2) Date: Jul. 10, 2019

(87) PCT Pub. No.: WO2018/134070
PCT Pub. Date: Jul. 26, 2018

(65) Prior Publication Data
US 2019/0353191 A1    Nov. 21, 2019

(30) Foreign Application Priority Data
Jan. 17, 2017 (DE) ..................... 10 2017 100 845.4

(51) Int. Cl.
*F16B 21/00* (2006.01)
*F16B 13/08* (2006.01)

(52) U.S. Cl.
CPC ................................ *F16B 13/0808* (2013.01)

(58) Field of Classification Search
CPC .................................................. F16B 13/0808

USPC .............. 411/340, 341, 342, 345, 903, 918; 292/307 R, 315, 316, 321, 322, 323, 327
See application file for complete search history.

(56) References Cited

U.S. PATENT DOCUMENTS

| | | | | |
|---|---|---|---|---|
| 2,014,814 A | * | 9/1935 | Reiter | A44B 1/34 24/108 |
| 2,123,764 A | * | 7/1938 | Berry | F16B 41/005 411/368 |
| 2,144,926 A | * | 1/1939 | Lawton | A44C 3/001 40/1.5 |
| 2,234,097 A | * | 3/1941 | Tinnerman | E05B 1/0015 403/257 |
| 2,401,202 A | * | 5/1946 | Tinnerman | F16B 37/065 411/429 |

(Continued)

FOREIGN PATENT DOCUMENTS

| CA | 2982478 A1 | 10/2016 |
|---|---|---|
| DE | 19 71 839 U | 11/1967 |

(Continued)

OTHER PUBLICATIONS

International Search Report (ISR) for corresponding Application No. PCT/EP2018/050372, dated Feb. 23, 2018.

(Continued)

*Primary Examiner* — Gary W Estremsky
(74) *Attorney, Agent, or Firm* — Renner, Otto, Boisselle & Sklar, LLP

(57) ABSTRACT

A toggle fixing with two obliquely arranged compression elements which enter into engagement with a screw thread of a screw passed through a screw hole and provide triangular support for the screw. A tension element absorbs compressive forces of the compression elements.

12 Claims, 3 Drawing Sheets

(56) References Cited

U.S. PATENT DOCUMENTS

| | | | | |
|---|---|---|---|---|
| 2,417,263 | A | * | 3/1947 | Morehouse ............ F16B 29/00 411/512 |
| 2,643,721 | A | * | 6/1953 | Arbuckle ............. B21D 28/343 83/123 |
| 2,847,745 | A | * | 8/1958 | Becker ................... F16B 21/20 24/108 |
| 3,102,508 | A | * | 9/1963 | Smith, Jr. ................ E06B 7/28 116/202 |
| 3,382,753 | A | * | 5/1968 | Tinnerman ............. F16B 37/02 411/437 |
| 4,075,924 | A | | 2/1978 | McSherry |
| 4,109,693 | A | * | 8/1978 | Paskert ................ F16B 33/002 411/166 |
| 4,170,118 | A | * | 10/1979 | Block .................... A44C 7/003 63/12 |
| 4,197,781 | A | | 4/1980 | Giannuzzi |
| 5,451,124 | A | * | 9/1995 | Meigs .................... B66C 15/00 411/436 |

FOREIGN PATENT DOCUMENTS

| | | |
|---|---|---|
| DE | 27 21 768 A1 | 12/1977 |
| DE | 29 15 650 A1 | 10/1979 |
| DE | 10 2014 015 683 A1 | 4/2016 |
| DE | 10 2015 116 421 A1 | 10/2016 |

OTHER PUBLICATIONS

Written Opinion (WO) for corresponding Application No. PCT/EP2018/050372, dated Feb. 23, 2018.
Search Report for corresponding German Application No. 10 2017 100 845.4, dated Sep. 6, 2017.
International Preliminary Report on Patentability (IPRP) for corresponding International Application No. PCT/EP2018/050372, dated Jul. 23, 2019.

* cited by examiner

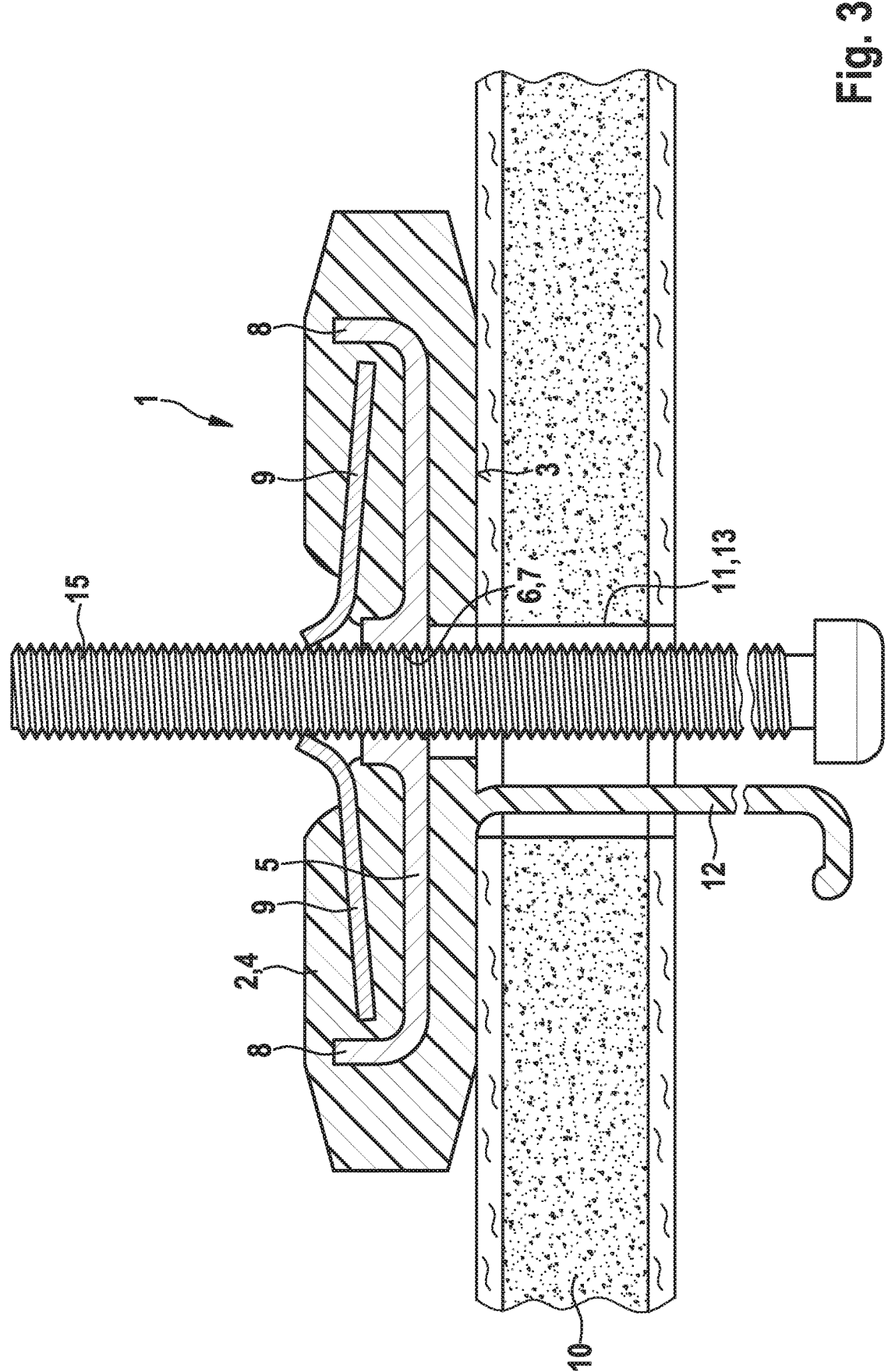

TOGGLE FIXING FOR A CAVITY FIXING

TECHNICAL FIELD OF INVENTION

The invention relates to a toggle fixing for a cavity fixing having the features described herein. The toggle fixing is especially provided for a fixing on a panel, for example a plasterboard panel, behind which a cavity is located, and is likewise suitable for a fixing on perforated bricks, hollow blocks and the like. Other fixings are not excluded.

DISCUSSION OF RELATED ART

A toggle fixing for a fixing on a panel behind which a cavity is located is known from German Offenlegungsschrift DE 10 2015 116 421 A1. The known toggle fixing has a crosspiece-like main body made of plastics material, which main body is longer than it is wide and thick so that it can be inserted in its longitudinal direction through a hole in a panel behind which a cavity is located and behind the rim of the hole of which it engages when, after insertion, it is positioned transversely on a rear side of the panel. In its longitudinal centre the main body of the known toggle fixing has a screw hole with an internal thread which passes through the main body in the direction of its thickness. For fixing an article to the main body of the known toggle fixing engaging behind the rim of the hole and positioned transversely on the rear side of the panel, a screw can be screwed into the internal thread of the screw hole. A screw of smaller diameter can be passed through the screw hole without engaging the thread. Its screw thread enters into engagement with a sheet metal strip which, as counterbearing element, lies in the main body at an acute angle with respect to a radial plane of the screw hole and projects into the screw hole. This allows adaptation to different screw diameters and to screw threads that do not fit the internal thread of the screw hole.

SUMMARY OF THE INVENTION

The problem of the invention is to propose a toggle fixing which provides a more stable hold for a screw and/or more stable support on a rear side of, for example, a panel.

That problem is solved according to the invention by the features of claim 1. The toggle fixing according to the invention has a crossmember with a main body made of plastics material and a tension element which has a higher tensile strength than the main body and especially consists of metal. The crossmember, that is to say the main body with the tension element, is longer than it is wide and thick so that, with its longitudinal direction aligned axially with respect to a hole in, for example, a panel, it is insertable through the hole and engages behind the rim of the hole when, after insertion, it is positioned transversely on a rear side of the hole. When positioned transversely on the rear side of the hole, the main body of the toggle fixing according to the invention is supported on the rear side of the panel at two opposite locations on the rim of the hole, so that an article can be attached thereto.

The crossmember of the toggle fixing according to the invention has a screw hole for passage of a screw, which screw hole passes through the crossmember transversely with respect to its longitudinal direction or possibly also obliquely at an angle, especially an acute angle, with respect to its longitudinal direction. The direction of the screw hole is here understood as being the thickness of the crossmember. The screw hole can have an internal thread or can be threadless.

In addition to the tension element, the toggle fixing according to the invention has one or preferably two compression elements arranged opposite one another in relation to an axis of the screw hole, which compression elements provide support, especially triangular or dome-like or framework-like support, for a screw passed through the screw hole: the compression element(s) are supported on the tension element at support points at a distance from the screw hole and, at least in some sections, run obliquely with respect to the tension element and with respect to the axis of the screw hole from the support point(s) in the direction of the axis of the screw hole. Seen from one side, the axis of the screw hole, the tension element and the compression element(s) form one or two triangles, domes or frameworks. Ends of the compression elements facing towards the axis of the screw hole project through an extended wall surface of the screw hole, so that a screw thread of a screw passed through the screw hole from a side opposite the compression elements enters into engagement with the compression element(s). The compression elements, like the tension element, can consist of metal.

The tension element extends in the longitudinal direction of the crossmember, this also including an oblique arrangement at an angle, preferably an acute angle, with respect to the longitudinal direction of the crossmember, and surrounds the screw hole with or without play, so that the tension element is connectible, so as to be resistant to tension, to a screw passing through the screw hole. For that purpose the tension element need not fully surround the screw hole; it is sufficient for the tension element to engage around or behind a screw passing through the screw hole so that the tension element is connectible to the screw so as to be resistant to tension. As a result, a tensile force exerted on the tension element can be transmitted by the tension element as a transverse force to the screw.

"Oblique" also means that the ends of the compression elements facing towards the axis of the screw hole are located further away from the tension element than the support points of the compression elements on the tension element. As a result, a tensile force exerted on the screw is transmitted by the compression elements as a compressive force obliquely away from the screw at the support points to the tension element and in the tension element as a tensile force and then as a transverse force to the screw or as an internal tensile force in the tension element between the support points. Furthermore, the compression element(s) transmit(s) a tensile force exerted on the screw as a compressive force to the support points located at a distance from the screw hole of the crossmember, which relieves the crossmember of transverse stress. The rim of a hole in a panel, on the rear side of which the crossmember of the toggle fixing according to the invention has been transversely positioned, is likewise relieved of load and the crossmember is provided with greater support at the support points at a distance from the hole on the rear side of the panel.

Preferably the compression element(s) is/are articulatedly supported on the tension element. Also possible is/are a compression element or compression elements that is/are integral with the tension element(s).

If two compression elements are present on opposite sides of the screw hole, the crossmember of the toggle fixing according to the invention can have a tension element which passes around the screw hole and supports the two compression elements at support points that are located opposite one another relative to the screw hole and at a distance from the screw hole. As a result, forces introduced as compressive forces into the compression elements by a screw stressed for tension are transmitted by the tension element as internal tensile forces between the support points, without any outwardly acting forces. In that case it is unnecessary for the tension element to surround the screw hole and to be connected so as to be resistant to tension to a screw passing through the screw hole, but it is also possible for the tension element to pass laterally past the screw hole. Two tension elements are also possible.

A distance between mutually facing ends of two oppositely arranged compression elements is preferably smaller than a diameter of the screw hole, so that a screw thread of a screw passed through the screw hole is reliably able to enter into engagement with the compression elements, and a tensile force exerted on the screw is introduced as a compressive force into the compression elements. On being passed through the screw hole and between the compression elements, a screw presses the two compression elements away from the main body of the toggle fixing and outwards away from the screw to such an extent that the screw is able to pass between the compression elements.

A tension element is possible which surrounds the screw hole with a smaller diameter than the main body of the crossmember. Preferably the tension element has an internal thread in the screw hole. This enables a screw to be screwed through the tension element. A screw of smaller diameter can be passed without rotation through the internally threaded screw hole of the tension element. In both cases a screw thread of the screw enters into engagement with the compression element(s) so that a tensile force exerted on the screw is transmitted obliquely outwards as a compressive force by the obliquely positioned compression elements.

To form a counterbearing for supporting the compression element(s), in an embodiment of the invention the tension element is bent at an angle at the support point(s) for the compression element(s). A joint or an articulated inter-engagement of the compression elements and the tension element at the support points is possible, but not necessary. At the support points, plastics material of the main body can be located between the compression elements and the tension element, so that the compression elements are not directly supported on the tension element but are indirectly supported thereon by way of the intermediately located plastics material.

BRIEF DESCRIPTION OF THE DRAWINGS

The invention is explained in greater detail below with reference to an exemplary embodiment shown in the drawing, wherein:

FIGS. 2 and 3 show uses of the toggle fixing from FIG. 1.

DETAILED DESCRIPTION OF THE INVENTION

Figure 1:
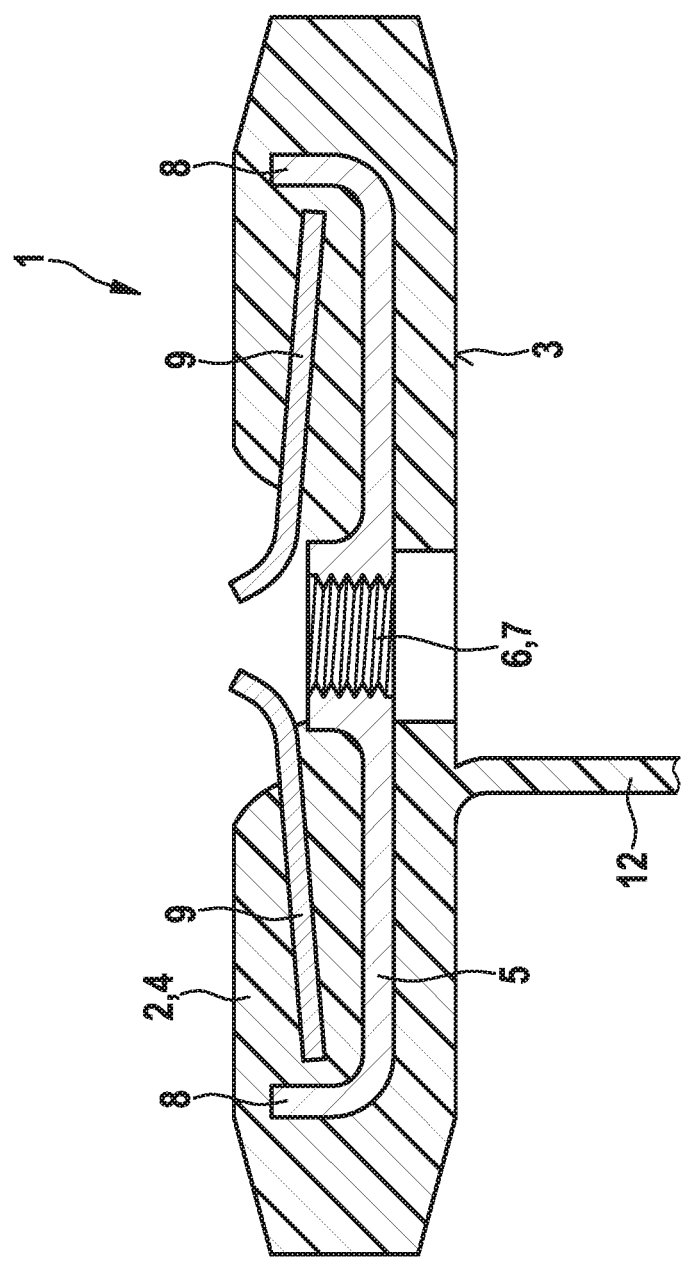
FIG. 1 shows a longitudinal section through a toggle fixing according to the invention.

The toggle fixing 1 according to the invention shown in the Figures has a cylindrical crossmember 2 with a flattened, planar longitudinal side which is here referred to as underside 3. Ends of the crossmember 2 taper frustoconically. The crossmember 2 is longer than it is wide and thick so that, with its longitudinal direction aligned axially with respect to a hole 11 in a panel 10, it can be inserted through the hole 11 and, after insertion, positioned transversely on a rear side of the hole 11, so that it engages over a hole rim 13 at opposite locations and rests against the underside 3 of the panel 10.

The crossmember 2 has a main body 4 made of plastics material and a sheet metal strip embedded in the plastics material as a tension element 5 having a higher tensile strength than the main body 4. The tension element 5 runs in the longitudinal direction of the crossmember 2 parallel to the underside 3 thereof. In its centre the crossmember 2 has a screw hole 6 which passes through a centre of the tension element 5 and has an internal thread 7 in the tension element 5. On the underside 3 the screw hole 6 passes through the main body 4 with a diameter that is larger than the diameter of the internal thread 7. On an upper side remote from the underside 3, the through-hole 6 is uncovered by a recess of large surface area in the main body 4. The screw hole 6 passes through the crossmember 2 of the toggle fixing 1 according to the invention transversely with respect to the underside 3 and transversely with respect to the tension element 5, this being understood here as meaning the direction of a thickness of the crossmember 2.

Ends of the tension element 5 are bent at an angle away from the underside 3 to form support points 8 for two compression elements 9. The compression elements 9 are sheet metal strips which, running obliquely from the support points 8 in the direction of the screw hole 6 at acute angles with respect to the tension element 5, are partly embedded in the main body 4 and are uncovered in the recess that uncovers the screw hole 6. The two compression elements 9 are arranged opposite one another in relation to the screw hole 6. At the screw hole 6 the compression elements 9 are a greater distance from the tension element 5 than at the support points 8 where they are further away from the screw hole 6. Plastics material of the main body 4 is located between ends of the compression elements 9 remote from the screw hole 6 and the bent portions of the tension element 5 forming the support points 8, so that the compression elements 9 are indirectly supported on the tension element 5 at the support points 8. As a result of the resilience of the plastics material of the main body 4 and the partial exposure of the compression elements, the compression elements 9 are articulatedly supported on the tension element 5. End regions of the compression elements 9 facing towards the screw hole 6 are bent away from the underside 3 at an obtuse angle. Ends of the compression elements 9 facing towards the screw hole 6 pass through an extended wall surface of the screw hole 6 so that, seen axially with respect to the screw hole 6, the ends of the compression elements 9 partly overlap the screw hole 6. A distance between the ends of the compression elements 9 that face towards one another and towards the screw hole 6 is smaller than a diameter of the screw hole 6.

For a fixing on a panel 10, for example a plasterboard panel, the toggle fixing 1 is inserted through a hole 11 in the panel 10, the diameter of which hole is at least as large as the crossmember 2 of the toggle fixing 1 is wide and thick, and the diameter of which is smaller than the crossmember 2 is long. For insertion, the crossmember 2 is in its longitudinal direction aligned axially with respect to the hole 11. For handling during insertion through the hole 11, the toggle fixing 1 has a strip 12 which is integral with the main body 4 consisting of plastics material and which projects from the underside 3 of the crossmember 2 next to the screw hole 6. By virtue of being resilient, the strip 12, for insertion of the crossmember 2 through the hole 11 in the panel 10, is able to rest against the underside 3 of the crossmember 2.

Figure 2:
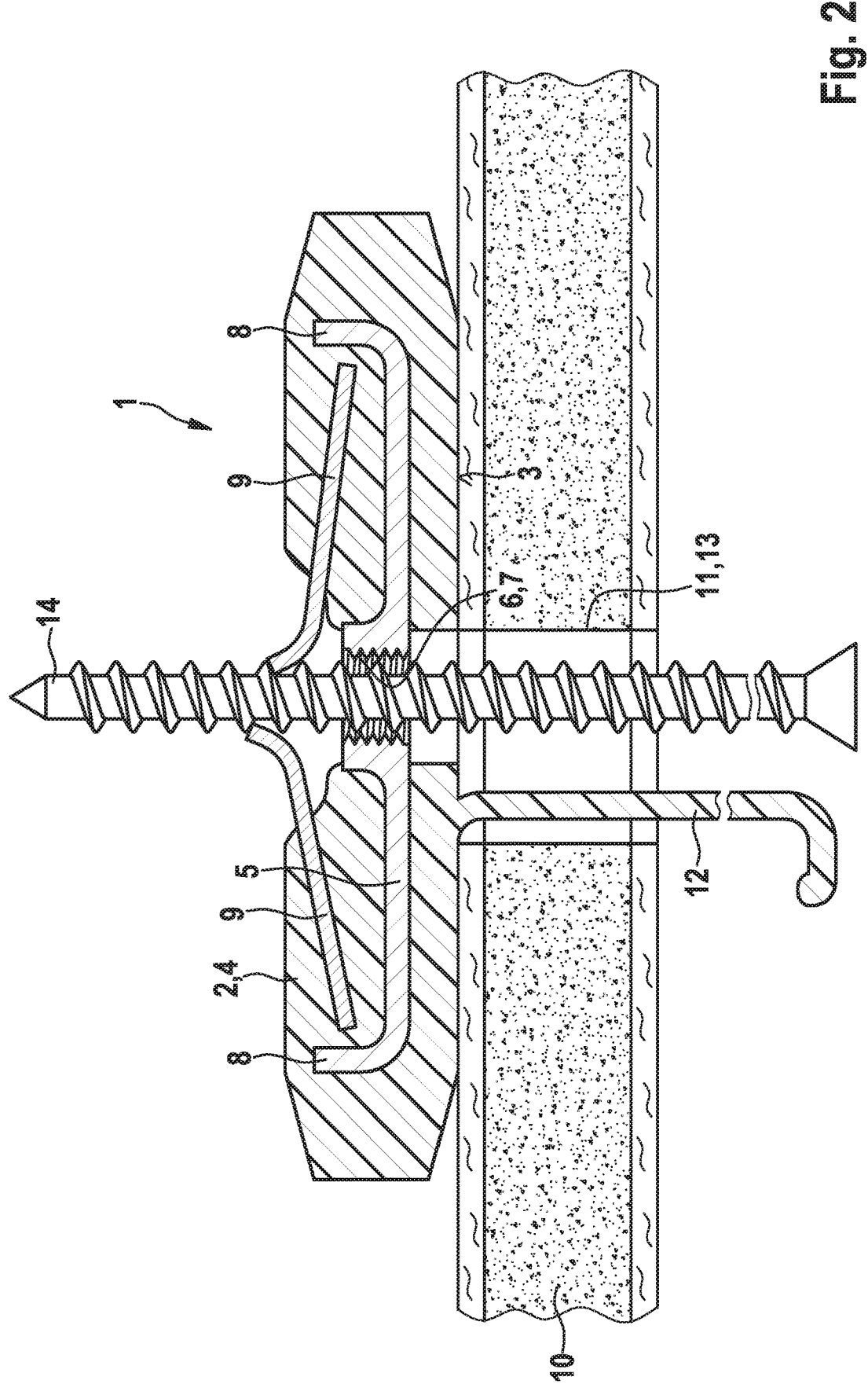

As soon as the crossmember 2 has fully emerged from the hole 11 on a rear side of the panel 10, it assumes an oblique or transverse position with respect to the strip 12 as a result of the resilience of the strip 12 and can be pulled back using the strip 12 so that it is supported on the rear side of the panel 10 and engages behind the rear side of the panel 10 at opposite locations on a rim 13 of the hole 11, as can be seen in FIGS. 2 and 3. As shown in FIG. 2, a screw 14, for example a wood screw, the screw thread of which has a smaller diameter than the internal thread 7 in the crossmember 2, can be passed into the screw hole 6 through the hole 11 in the panel 10. In so doing the screw thread enters into engagement with the ends of the compression elements 9 facing towards it, which ends are pressed by the screw 14 away from the tension element 5 and laterally away from the screw 14. As a result, the compression elements 9 are adapted to a diameter of the screw thread of the screw 14. As the screw 14 is passed through the screw hole 6, the toggle fixing 1 is held in contact with the rear side of the panel 10 by its strip 12 which passes, laterally next to the screw 14, through the hole 11 to a front side of the panel 10. By virtue of its thread engagement, the screw 14 transmits a tensile force exerted on the screw 14 as compressive forces to the compression elements 9 which introduce the compressive forces into the tension element 5 at the support points 8. In the tension element 5 the forces act as an internal tensile force, without forces being released to the outside. The screw 14, the compression elements 9 and the tension element 5 form two triangles located opposite one another in an axial plane of the screw 14, which triangles introduce a tensile force exerted on the screw 14 into the tension element 5 as an internal tensile force at the support points 8.

In FIG. 3, a machine screw 15 having a screw thread complementary to the internal thread 7 of the screw hole 6 in the crossmember 2 of the toggle fixing 1 according to the invention has been screwed through the screw hole 6 of the crossmember 2. Its screw thread also enters into engagement with the ends of the compression elements 9. If a tensile force is exerted on the machine screw 15, it subjects the crossmember 2 to a transverse load in its centre by engagement in the internal thread 7 of the screw hole 6. At the same time the compression elements 9, as explained above in connection with FIG. 2, support the machine screw 15 as a result of the engagement of the compression elements 9 on the screw thread. The compression elements 9 support the machine screw 15 at the support points 8 located at at a distance from the screw hole 6 and from the hole 11 in the panel 10.

LIST OF REFERENCE SIGNS

Toggle Fixing for a Cavity Fixing

1 toggle fixing
2 crossmember
3 underside
4 main body
5 tension element
6 screw hole
7 internal thread
8 support point
9 compression element
10 panel
11 hole
12 strip
13 hole rim
14 screw
15 machine screw

The invention claimed is:

1. A toggle fixing for a cavity fixing, having a crossmember which is longer than it is wide and thick, the crossmember having a main body made of plastics material and a screw hole for passage of a screw, which screw hole passes through the crossmember in the direction of its thickness, wherein a tension element and a compression element are arranged on the main body; the tension element has a higher tensile strength than the main body; the tension element surrounds the screw hole in the crossmember so that the tension element is connectible, so as to be resistant to tension, to a screw passing through the screw hole; the tension element extends in a longitudinal direction of the crossmember; and the compression element is supported on the tension element at a distance from the screw hole and runs obliquely with respect to the tension element from a support point on the tension element and obliquely through an extended wall surface of the screw hole of the crossmember so that the compression element can be brought into engagement with a screw thread of a screw passed through the screw hole.

2. The toggle fixing according to claim 1, wherein the compression element is articulatedly supported on the tension element.

3. The toggle fixing according to claim 1 wherein the tension element or a second tension element extends on two opposite sides away from the screw hole in the longitudinal direction of the crossmember; and the toggle fixing has two compression elements on the two opposite sides of the screw hole, which compression elements are supported on the tension element(s).

4. The toggle fixing according to claim 3, wherein a distance between the two compression elements is smaller than a diameter of the screw hole in the tension element.

5. The toggle fixing according to claim 1, wherein the tension element has an internal thread in the screw hole.

6. The toggle fixing according to claim 1, wherein the tension element is bent at an angle at the support point(s) to support the compression element(s).

7. The toggle fixing according claim 1, wherein at the support point(s) plastics material of the main body is located between the compression element(s) and the tension element.

8. The toggle fixing according to claim 1, wherein the tension element and/or the compression element consist(s) of metal.

9. The toggle fixing according to claim 1, wherein the tensile force exerted on the tension element is transmitted by the tension element as a transverse force to the screw.

10. The toggle fixing according to claim 1, wherein the tension element and the compression element are configured to separately engage different portions of the screw when the screw is inserted through the screw hole.

11. A toggle fixing for a cavity fixing, having a crossmember which is longer than it is wide and thick, the crossmember having a main body made of plastics material and a screw hole for passage of a screw, which screw hole passes through the crossmember in the direction of its thickness, wherein a tension element and a compression element are arranged on the main body; the tension element has a higher tensile strength than the main body; the tension element surrounds the screw hole in the crossmember so that the tension element is connectible, so as to be resistant to tension, to a screw passing through the screw hole; the tension element extends in a longitudinal direction of the crossmember; and the compression element is supported on the tension element at a distance from the screw hole and runs obliquely with respect to the tension element from a support point on the tension element through an extended wall surface of the screw hole of the crossmember so that the compression element can be brought into engagement with a screw thread of a screw passed through the screw hole, wherein the tension element has an internal thread in the screw hole.

12. A toggle fixing for a cavity fixing, having a crossmember which is longer than it is wide and thick, the crossmember having a main body made of plastics material and a screw hole for passage of a screw, which screw hole passes through the crossmember in the direction of its thickness, wherein a tension element and a compression element are arranged on the main body; the tension element has a higher tensile strength than the main body; the tension element surrounds the screw hole in the crossmember so that the tension element is connectible, so as to be resistant to tension, to a screw passing through the screw hole; the tension element extends in a longitudinal direction of the crossmember; and the compression element is supported on the tension element at a distance from the screw hole and runs obliquely with respect to the tension element from a support point on the tension element through an extended wall surface of the screw hole of the crossmember so that the compression element can be brought into engagement with a screw thread of a screw passed through the screw hole, wherein the tension element is bent at an angle at the support point(s) to support the compression element(s).

* * * * *